United States Patent
Wang et al.

(10) Patent No.: US 12,278,588 B2
(45) Date of Patent: Apr. 15, 2025

(54) METHOD AND APPARATUS FOR CONTROLLING OUTPUT POWER OF GENERATOR, AND GENERATOR SYSTEM

(71) Applicant: ECOFLOW INC., Shenzhen (CN)

(72) Inventors: Lei Wang, Shenzhen (CN); Xi Chen, Shenzhen (CN)

(73) Assignee: ECOFLOW INC., Shenzhen (CN)

( * ) Notice: Subject to any disclaimer, the term of this patent is extended or adjusted under 35 U.S.C. 154(b) by 0 days.

(21) Appl. No.: 18/483,910

(22) Filed: Oct. 10, 2023

(65) Prior Publication Data
US 2024/0048078 A1    Feb. 8, 2024

Related U.S. Application Data

(63) Continuation of application No. PCT/CN2022/086165, filed on Apr. 11, 2022.

(30) Foreign Application Priority Data

Apr. 15, 2021   (CN) .......................... 202110405228.9

(51) Int. Cl.
*H02P 9/00*   (2006.01)
(52) U.S. Cl.
CPC .................... *H02P 9/006* (2013.01)
(58) Field of Classification Search
CPC .... H02P 9/006; H02P 9/00; H02P 9/04; H02P 9/10
See application file for complete search history.

(56) References Cited

U.S. PATENT DOCUMENTS

| | | | |
|---|---|---|---|
| 4,937,723 A | 6/1990 | Rozman et al. | |
| 6,366,475 B2 | 4/2002 | Nakazawa et al. | |
| 8,618,681 B2 | 12/2013 | Yamamura et al. | |
| 2011/0273148 A1* | 11/2011 | Ueno | H02P 9/48 322/28 |

(Continued)

FOREIGN PATENT DOCUMENTS

| | | |
|---|---|---|
| CN | 104300574 A | 1/2015 |
| CN | 104300574 B | 4/2017 |

(Continued)

OTHER PUBLICATIONS

The World Intellectual Property Organization (WIPO) International Search Report for PCT/CN2022/086165 Jun. 29, 2022 5 Pages (with translation).

(Continued)

*Primary Examiner* — Julio C. Gonzalez
(74) *Attorney, Agent, or Firm* — ANOVA LAW GROUP, PLLC

(57) ABSTRACT

A method for controlling an output power of a generator is provided. A target control variable used for controlling a target controlled circuit can be determined according to an output voltage value of the generator, an output current value of the target controlled circuit, an output voltage value of the target controlled circuit, an overload voltage reference value of the generator, an output voltage reference value of the target controlled circuit, and an output current reference value of the target controlled circuit, and a corresponding drive signal is generated according to the target control variable, to regulate an output power of the target controlled circuit.

12 Claims, 3 Drawing Sheets

(56) References Cited

U.S. PATENT DOCUMENTS

2018/0362181 A1* 12/2018 Iwashima ................. H02J 1/14
2019/0293722 A1* 9/2019 Choi ...................... G01R 31/36

FOREIGN PATENT DOCUMENTS

| CN | 108696156 A | 10/2018 |
| CN | 113098343 A | 7/2021 |
| JP | 2000166100 A | 6/2000 |
| JP | 2012244691 A | 12/2012 |
| JP | 2018085927 A | 5/2018 |

OTHER PUBLICATIONS

Notification of Grounds for Rejection for Application No. 2023-551079 Sep. 27, 2024 6 Pages.
The European Patent Office (EPO) The Extended European Search Report for Application No. 22787496.3 Sep. 16, 2024 7 Pages.

* cited by examiner

METHOD AND APPARATUS FOR CONTROLLING OUTPUT POWER OF GENERATOR, AND GENERATOR SYSTEM

CROSS-REFERENCE TO RELATED APPLICATIONS

This application is a continuation application of PCT patent application No. PCT/CN2022/086165, filed on Apr. 11, 2022, which claims priority to Chinese Patent Application No. 202110405228.9, filed on Apr. 15, 2021, all of which is incorporated herein by reference in their entirety.

TECHNICAL FIELD

This application relates to the field of generator technologies, in particular, to a generator output power control method and apparatus, and a generator system.

BACKGROUND

The description herein provides only background information related to this application, but does not necessarily constitute the exemplary technology.

When performing a plurality of outputs, a generator such as a gasoline generator is prone to overload. A conventional solution to avoid overload includes:

1. Time-sharing output: Two paths A and B are used as an example, either only A output or only B output exists, and a disadvantage of this manner is that utilization of the generator is relatively low; and
2. The two paths work simultaneously, but powers of the two paths are coordinated through communication, and a disadvantage of this manner is that a response speed of a circuit is relatively slow.

SUMMARY

According to various embodiments of this application, the embodiments of this application provide a method and an apparatus for controlling an output power of a generator, and a generator system.

Specifically, the embodiments of this application provide the following technical solutions.

According to a first aspect, an embodiment of this application provides a method for controlling an output power of a generator, where at least two output circuits are disposed on an output end of the generator, at least one output circuit of the output circuits is configured as a target controlled circuit, and the method for controlling an output power includes:

obtaining an output voltage value of the generator, an output current value of the target controlled circuit, and an output voltage value of the target controlled circuit;

obtaining an overload voltage reference value of the generator, an output voltage reference value of the target controlled circuit, and an output current reference value of the target controlled circuit;

performing calculation according to the output voltage value of the generator, the output current value of the target controlled circuit, the output voltage value of the target controlled circuit, the overload voltage reference value of the generator, the output voltage reference value of the target controlled circuit, and the output current reference value of the target controlled circuit, to obtain a target control variable; and generating a drive signal according to the target control variable, and sending the drive signal to the target controlled circuit, so that the target controlled circuit regulates an output power according to the drive signal.

Further, an embodiment of this application further provides an apparatus for controlling an output power of a generator, where at least two output circuits are disposed on an output end of the generator, and at least one output circuit of the output circuits is configured as a target controlled circuit; and the apparatus for controlling an output power includes:

a first obtaining circuit, configured to obtain an output voltage value of the generator, an output current value of the target controlled circuit, and an output voltage value of the target controlled circuit;

a second obtaining circuit, configured to obtain an overload voltage reference value of the generator, an output voltage reference value of the target controlled circuit, and an output current reference value of the target controlled circuit;

a feedback circuit, configured to perform calculation according to the output voltage value of the generator, the output current value of the target controlled circuit, the output voltage value of the target controlled circuit, the overload voltage reference value of the generator, the output voltage reference value of the target controlled circuit, and the output current reference value of the target controlled circuit, to obtain a target control variable; and a control circuit, configured to generate a drive signal according to the target control variable, and send the drive signal to the target controlled circuit, so that the target controlled circuit regulates an output power according to the drive signal.

According to a third aspect, an embodiment of this application provides a generator system, including:

a generator, where at least two output circuits are disposed on an output end of the generator, and at least one output circuit of the output circuits is configured as a target controlled circuit; and an apparatus for controlling an output power, where the apparatus for controlling an output power includes:

a first obtaining circuit, configured to obtain an output voltage value of the generator, an output current value of the target controlled circuit, and an output voltage value of the target controlled circuit;

a second obtaining circuit, configured to obtain an overload voltage reference value of the generator, an output voltage reference value of the target controlled circuit, and an output current reference value of the target controlled circuit;

a feedback circuit, configured to perform calculation according to the output voltage value of the generator, the output current value of the target controlled circuit, the output voltage value of the target controlled circuit, the overload voltage reference value of the generator, the output voltage reference value of the target controlled circuit, and the output current reference value of the target controlled circuit, to obtain a target control variable; and a control circuit, configured to generate a drive signal according to the target control variable, and send the drive signal to the target controlled circuit, so that the target controlled circuit regulates an output power according to the drive signal.

Details of one or more embodiments of this application are provided in the accompanying drawings and descriptions below. Other features, objectives, and advantages of this application will become apparent from the specification, the accompanying drawings, and the claims.

BRIEF DESCRIPTION OF THE DRAWINGS

To describe the technical solutions in the embodiments of this application or in existing technologies more clearly, accompanying drawings for describing the embodiments or the existing technologies are briefly described below. Obviously, the accompanying drawings in the following description show some embodiments of this application, and a person of ordinary skill in the art may still derive other drawings from these accompanying drawings without creative efforts.

DETAILED DESCRIPTION

In order to make objectives, technical solutions, and advantages of embodiments of this application clearer, the technical solutions in the embodiments of this application will be clearly and completely described in the following with reference to the accompanying drawings in the embodiments of this application. Apparently, the embodiments to be described are a part rather than all of the embodiments of this application. All other embodiments obtained by a person of ordinary skill in the art based on the embodiments of this application without creative efforts shall fall within the protection scope of this application.

Figure 1:
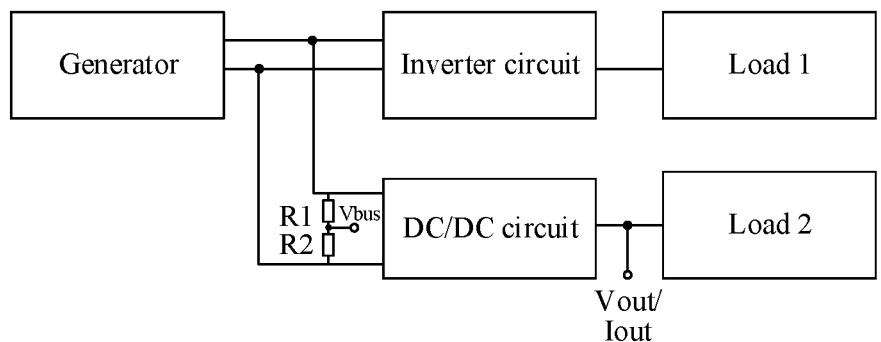
FIG. 1 is a schematic diagram of an output circuit of a generator according to an embodiment of this application.

An embodiment of this application provides a method for controlling an output power of a generator. The method is applied to a generator with a surplus multi-load. At least two output circuits are disposed on an output end of the generator (as shown in FIG. 1), and at least one output circuit of all the output circuits is a target controlled circuit. For example, in a case, there are two outputs circuits of the generator, which are respectively an inverter circuit and a DC/DC circuit. The DC/DC circuit is the target controlled circuit. It may be understood that generally, efficiency of the generator is relatively high in a heavy load and is relatively low in a light load. Therefore, by adding an energy storage device, the generator can continuously work in a high-efficiency range in a light load, and then excess energy after the load is deducted is outputted to the energy storage device. Therefore, the target controlled circuit may be understood as an energy storage circuit set to enable the generator to work in a high-efficiency state in the light load. In another embodiment, the target controlled circuit may also be determined according to priorities of a plurality of outputs, for example, a path with a lower priority is used as the target controlled circuit, so that when the generator is overloaded, an output power of the target controlled circuit with the lower priority is regulated, to ensure that an output circuit with a higher priority can perform normal output. The following explains and describes the method for controlling an output power applied to the generator with the surplus multi-load provided in this embodiment.

Figure 2:
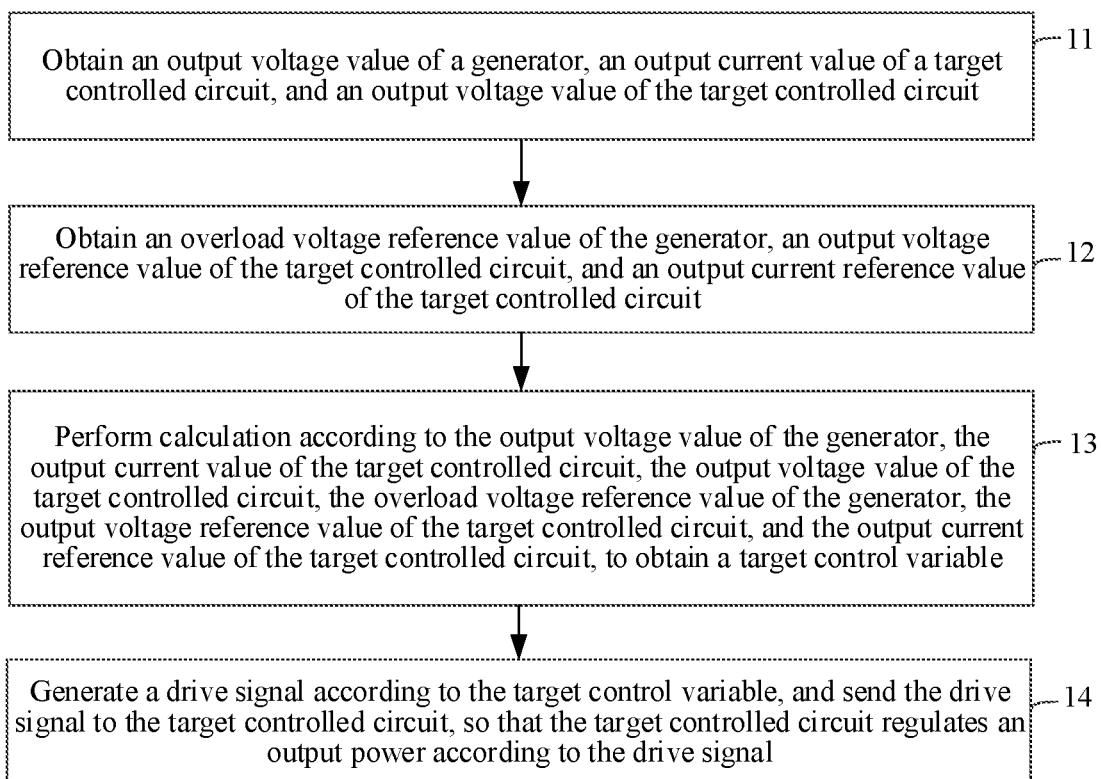
FIG. 2 is a flowchart of a method for controlling an output power of a generator according to an embodiment of this application.

FIG. 2 is a flowchart of a method for controlling an output power of a generator according to an embodiment of this application. As shown in FIG. 2, according to the method for controlling an output power of a generator provided in this embodiment of this application, at least two output circuits are disposed on an output end of the generator. At least one output circuit of all the output circuits is a target controlled circuit. The method specifically includes the following steps.

Step 11: Obtain an output voltage value of the generator, an output current value of the target controlled circuit, and an output voltage value of the target controlled circuit.

In this step, the output voltage value Vbus of the generator may be collected by using a voltage collection circuit formed by R1 and R2 in FIG. 1. The output current value Iout and the output voltage value Vout of the target controlled circuit may be collected by using a current and voltage detection apparatus. The output voltage value of the generator is an input voltage value of the target controlled circuit.

Step 12: Obtain an overload voltage reference value of the generator, an output voltage reference value of the target controlled circuit, and an output current reference value of the target controlled circuit.

The overload voltage reference value may be determined according to a change relationship or a change curve between an output power and an output voltage of the generator. Generally, during normal operation, the output voltage of the generator does not change as the output power increases but is stable within a specific voltage range. When overload occurs, the output voltage of the generator rapidly decreases as the output power increases. Therefore, the overload voltage reference value may be determined, and when the output voltage exceeds the overload voltage reference value, it is considered that the generator has been overloaded.

The output voltage reference value and the output current reference value of the target controlled circuit may be set according to a supply voltage and a supply current required by a load carried on the target controlled circuit. An output voltage and an output current are compared with corresponding reference values, to ensure that when the generator is overloaded, the target controlled circuit can output a corresponding voltage and current to the load.

Step 13: Perform calculation according to the output voltage value of the generator, the output current value of the target controlled circuit, the output voltage value of the target controlled circuit, the overload voltage reference value of the generator, the output voltage reference value of the target controlled circuit, and the output current reference value of the target controlled circuit, to obtain a target control variable.

Step 14: Generate a drive signal according to the target control variable, and send the drive signal to the target controlled circuit, so that the target controlled circuit regulates an output power according to the drive signal.

In this embodiment, a control variable used for controlling the target controlled circuit may be determined according to the output voltage value Vbus of the generator, the output current value Iout of the target controlled circuit, the output voltage value Vout of the target controlled circuit, the overload voltage reference value Vrefin of the generator, the output voltage reference value Vrefout of the target controlled circuit, and the output current reference value Iref of the target controlled circuit. In this step, it may be understood that the overload voltage reference value Vrefin of the generator is used for determining whether the generator is overloaded, and the output voltage reference value Vrefout of the target controlled circuit and the output current reference value Iref of the target controlled circuit are used for determining a power supply status required by the load corresponding to the target controlled circuit. Therefore, with the constraint of the overload voltage reference value Vrefin of the generator, the output voltage reference value Vrefout of the target controlled circuit, and the output current reference value Iref of the target controlled circuit, when the generator is overloaded, an output power of the target controlled circuit can be reduced to resolve the overload problem, and when the generator is not overloaded, the output power of the target controlled circuit can be improved, thereby improving utilization of the output power of the generator. Therefore, by using the method, utilization of the generator with two or more outputs can be improved, and overload can also be avoided. It can be learned from that by using the solution in this embodiment, the problem that the utilization of the generator is relatively low in the solution 1 (time-sharing output) in the background can be resolved. In addition, in the solution in this embodiment, control of the target controlled circuit needs to rely on only an input/output parameter of the target controlled circuit, without obtaining information about another output circuit of the generator, that is, without using additional communication between a plurality of output circuits, so that a response speed of the entire circuit can be effectively improved, and the problem that the response speed of the circuit is relatively slow in the solution 2 (powers of two paths are coordinated through communication) in the background. It can be learned from that in this embodiment, the control variable used for controlling the target controlled circuit is determined according to the output voltage value of the generator, the output current value of the target controlled circuit, the output voltage value of the target controlled circuit, the overload voltage reference value of the generator, the output voltage reference value of the target controlled circuit, and the output current reference value of the target controlled circuit. Therefore, the control of the target controlled circuit needs to rely on only the input/output parameter of the target controlled circuit, without using additional communication between the plurality of output circuits, so that the response speed of the entire circuit can be effectively improved.

In this embodiment, it should be noted that, the overload voltage reference value Vrefin of the generator may be determined according to the curve between the output power and the output voltage of the generator. When the output power of the generator is overloaded, the output voltage rapidly decreases, and when the output voltage value of the generator is less than Vrefin, it may be considered that the generator is overloaded.

Further, based on the content of the foregoing embodiment, in this embodiment, the control variable used for controlling the target controlled circuit may be determined according to the output voltage value Vbus of the generator, the output current value Tout of the target controlled circuit, the output voltage value Vout of the target controlled circuit, the overload voltage reference value Vrefin of the generator, the output voltage reference value Vrefout of the target controlled circuit, and the output current reference value Iref of the target controlled circuit in the following manner:

performing calculation according to the output voltage value Vbus and the overload voltage reference value Vrefin of the generator, to obtain a first difference, and obtaining a first current loop given value Iref1 according to the first difference;

determining a smaller value of the first current loop given value Iref1 and the output current reference value Iref, calculating the smaller value and the output current value Tout of the target controlled circuit, to obtain a second difference, and obtaining a first control variable Iref2 according to the second difference;

calculating the output voltage reference value Vrefout of the target controlled circuit and the output voltage value Vout of the target controlled circuit, to obtain a third difference, and obtaining a second control variable Iref3 according to the third difference; and determining a smaller value of the first control variable Iref2 and the second control variable Iref3 as the control variable used for controlling the target controlled circuit.

Figure 3:
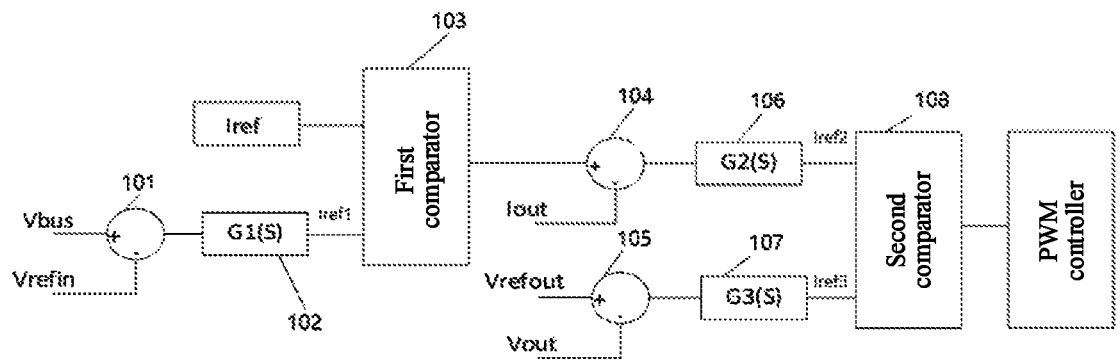
FIG. 3 is a first schematic diagram of an implementation of a method for controlling an output power of a generator according to an embodiment of this application.

In this embodiment, FIG. 3 is a schematic diagram of an implementation principle. The output voltage value Vbus and the overload voltage reference value Vrefin of the generator are calculated to obtain a first difference, and then the first difference is inputted into a first regulator 102, to obtain a first current loop given value Iref1. G1(S) represents a transfer function, and a specific function may be set as required. In an implementation, the output voltage value Vbus and the overload voltage reference value Vrefin of the generator may be calculated by using a first adder 101 to obtain the first difference.

As shown in FIG. 3, the first current loop given value Iref1 is compared with the output current reference value Iref of the target controlled circuit, a smaller value of the first current loop given value Iref1 and the output current reference value Iref of the target controlled circuit is determined, the smaller value and the output current value Iout of the target controlled circuit are calculated to obtain a second difference, then the second difference is inputted into a second regulator 106, and the second regulator 106 outputs a first control variable Iref2. In an implementation, the first current loop given value Iref1 may be compared with the output current reference value Iref of the target controlled circuit by using a first comparator 103 to obtain the smaller value. The smaller value and the output current value Iout of the target controlled circuit may be calculated by using a second adder 104 to obtain the second difference.

As shown in FIG. 3, the output voltage reference value Vrefout of the target controlled circuit and the output voltage value Vout of the target controlled circuit are calculated to obtain a third difference, then the third difference is inputted into a third regulator 107, and the third regulator 107 outputs a second control variable Iref3. The output voltage reference value Vrefout of the target controlled circuit and the output voltage value Vout of the target controlled circuit may be calculated by using a third adder 105 to obtain the third difference.

As shown in FIG. 3, the first control variable Iref2 is compared with the second control variable Iref3, and a smaller value of the first control variable Iref2 and the second control variable Iref3 is determined as the control variable used for controlling the target controlled circuit. The smaller value of the first control variable Iref2 and the second control variable Iref3 may be determined by using a second comparator 108.

As shown in FIG. 3, when the output power of the generator is overloaded, the output voltage rapidly decreases. When the output voltage value is less than Vrefin, it may be considered that overload occurs. Therefore, a detected voltage value Vbus and a reference voltage value Vrefin corresponding to the voltage value are calculated to obtain a first difference, then the first difference is outputted to the first regulator 102 for regulation, to obtain a first current loop given value Iref1, a smaller one of the first current loop given value Iref1 and the output current reference value Iref of the target controlled circuit is obtained by using the first comparator 103, to implement amplitude limiting on Iref, then the smaller one and the output current value Tout of the target controlled circuit are calculated to obtain a second difference, and then the second difference is sent to the second regulator 106, to obtain the first control variable Iref2. Vrefout refers to the output voltage reference value of the target controlled circuit. The output voltage reference value and a detected voltage Vout are sent to the third adder 105 to calculate a difference, to obtain a third difference, and then the third difference is sent to the third regulator 107 to obtain the second control variable Iref3. A smaller one of the two control variables is obtained by using the second comparator 108 as a final control variable, and the final control variable is outputted to a pulse width modulation (PWM) controller, to control the target controlled circuit. The first regulator 102 to the third regulator 107 may each adopt a proportional integral derivative (PID) regulator or a proportional integral (PI) regulator. This is not specifically limited. It can be learned from that in this embodiment, after sampling and difference calculation are performed on input and output of the target controlled circuit, a control variable is determined to regulate DC-DC circuit, without using additional communication between the two output circuits. Therefore, the response speed of the entire circuit can be effectively improved.

Further, in this embodiment, an implementation different from that in the foregoing embodiment is used. A detailed description is as follows.

In this embodiment, the control variable used for controlling the target controlled circuit may be determined according to the output voltage value Vbus of the generator, the output current value Tout of the target controlled circuit, the output voltage value Vout of the target controlled circuit, the overload voltage reference value Vrefin of the generator, the output voltage reference value Vrefout of the target controlled circuit, and the output current reference value Iref of the target controlled circuit in the following manner:

calculating the output voltage value Vbus and the overload voltage reference value Vrefin of the generator, to obtain a fourth difference, and obtaining a second current loop given value Iref4 according to the fourth difference;

calculating the output current reference value Iref of the target controlled circuit and the output current value Tout of the target controlled circuit, to obtain a fifth difference, and obtaining a third control variable Iref5 according to the fifth difference;

calculating the output voltage reference value Vrefout of the target controlled circuit and the output voltage value Vout of the target controlled circuit, to obtain a sixth difference, and obtaining a fourth control variable Iref6 according to the sixth difference; and determining a smaller value of the third control variable Iref5 and the fourth control variable Iref6, and comparing the smaller value with the second current loop given value, to obtain a smaller value as the control variable used for controlling the target controlled circuit.

Figure 4:
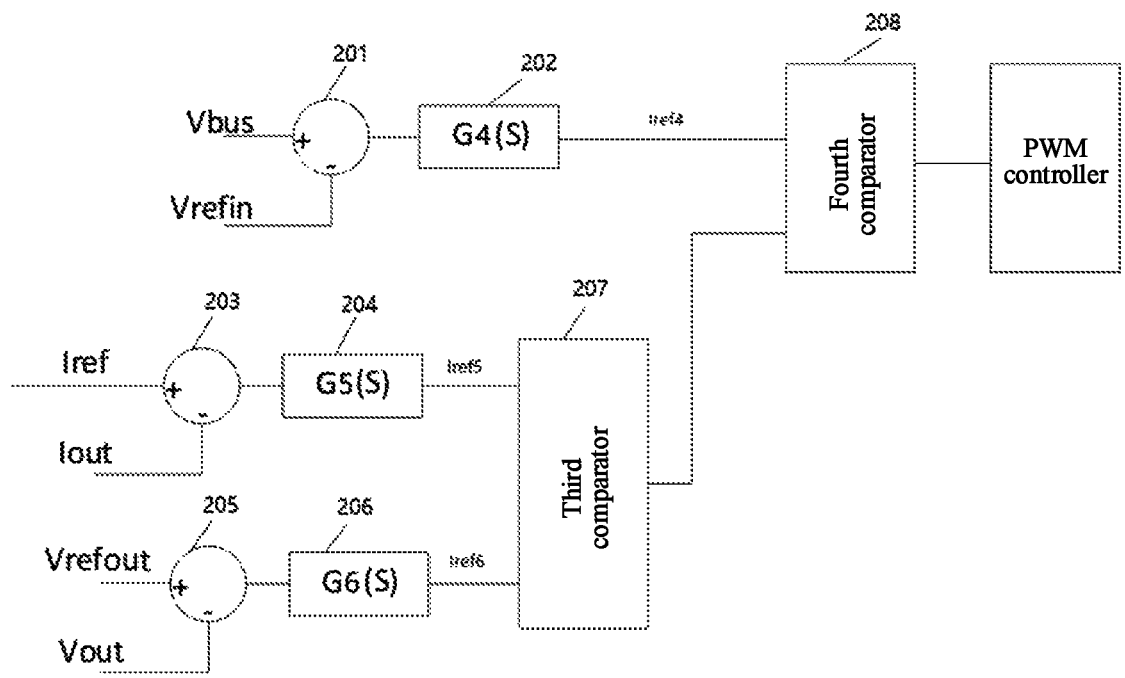
FIG. 4 is a second schematic diagram of an implementation of a method for controlling an output power of a generator according to an embodiment of this application.

As shown in FIG. 4, the output voltage value Vbus and the overload voltage reference value Vrefin of the generator are calculated, to obtain a fourth difference, and then the fourth difference is inputted into a fourth regulator 202, to obtain a second current loop given value Iref4. In an implementation, the output voltage value Vbus and the overload voltage reference value Vrefin of the generator may be calculated by using a fourth adder 201 to obtain the fourth difference.

As shown in FIG. 4, the output current reference value Iref of the target controlled circuit is compared with the output current value Iout of the target controlled circuit, to obtain a fifth difference, then the fifth difference is inputted into a fifth regulator 204, and the fifth regulator 204 outputs a third control variable Iref5. In an implementation, the output current reference value Iref of the target controlled circuit and the output current value Iout of the target controlled circuit may be calculated by using a fifth adder 203 to obtain the fifth difference.

As shown in FIG. 4, the output voltage reference value Vrefout of the target controlled circuit the output voltage value Vout of the target controlled circuit are calculated to obtain a sixth difference, then the sixth difference is inputted into a sixth regulator 206, and the sixth regulator 206 outputs a fourth control variable Iref6. The output voltage reference value Vrefout of the target controlled circuit and the output voltage value Vout of the target controlled circuit may be calculated by using a sixth adder 205 to obtain the sixth difference.

As shown in FIG. 4, the third control variable Iref5 is compared with the fourth control variable Iref6, a smaller value of the third control variable Iref5 and the fourth control variable Iref6 is determined, and the smaller value is compared with the second current loop given value Iref4, to obtain a smaller value as the control variable used for controlling the target controlled circuit.

It may be understood that compared with FIG. 3, FIG. 4 shows another feedback loop control structure. In FIG. 4, an output side of the target controlled circuit is directly controlled to determine a control variable, and a control variable is determined according to an input side. Then a smaller one of the two control variables is obtained, to determine a final control variable. It should be noted that, FIG. 3 and FIG. 4 show two different implementations. During specific use, a proper implementation may be selected.

Further, based on the content of the foregoing embodiment, obtaining a corresponding control variable according to a difference is performing PID regulation or PI regulation on a difference to obtain a corresponding control variable. It can be learned from that the first regulator 102, the second regulator 106, the third regulator 107, the fourth regulator 202, the fifth regulator 204, and the sixth regulator 206 may be a PID regulator or a PI regulator.

It may be understood that the PI regulator may be a linear controller. The PI regulator forms a control deviation according to a given value and an actual output value, and forms a control variable by using a proportional and an integral of the deviation through linear combination, to control a controlled object. The PID controller is the most widely used automatic controller that performs control according to proportional (P), integral (I), and differential (D) of a deviation during concurrent control and has the advantages of a simple principle, easy implementation, wide applicability, independent control parameters, simple selection of parameters, and the like.

Further, based on the content of the foregoing embodiment, in this embodiment, the target controlled circuit may be modulated through pulse width modulation PWM. Correspondingly, a control circuit may control the target controlled circuit according to the control variable, to control the target controlled circuit. For example, in an embodiment, the control circuit may use a PWM controller.

Figure 5:
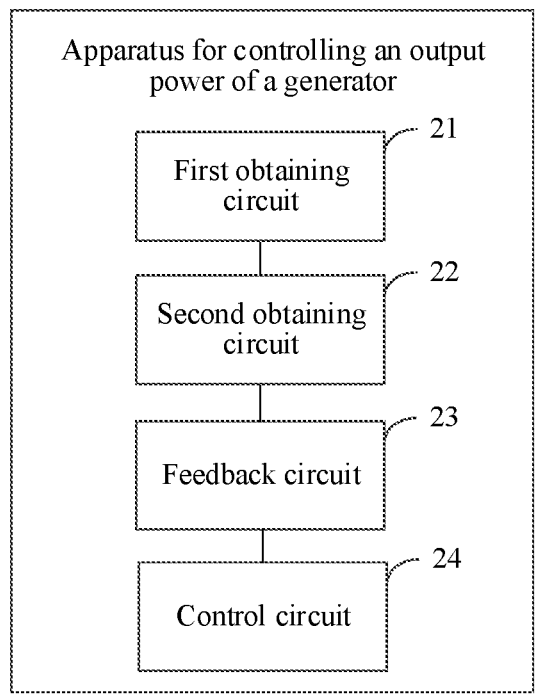
FIG. 5 is a schematic structural diagram of an apparatus for controlling an output power of a generator according to an embodiment of this application.

Another embodiment of this application provides an apparatus for controlling an output power of a generator. At least two output circuits are disposed on an output end of the generator. At least one output circuit of all the output circuits is a target controlled circuit. Referring to FIG. 5, the apparatus includes:

- a first obtaining circuit 21, configured to obtain an output voltage value of the generator, an output current value of the target controlled circuit, and an output voltage value of the target controlled circuit;
- a second obtaining circuit 22, configured to obtain an overload voltage reference value of the generator, an output voltage reference value of the target controlled circuit, and an output current reference value of the target controlled circuit;
- a feedback circuit 23, configured to determine, according to the output voltage value of the generator, the output current value of the target controlled circuit, the output voltage value of the target controlled circuit, the overload voltage reference value of the generator, the output voltage reference value of the target controlled circuit, and the output current reference value of the target controlled circuit, a control variable used for controlling the target controlled circuit; and
- a control circuit 24, configured to generate a corresponding drive signal according to the control variable, to regulate an output power of the target controlled circuit.

The apparatus for controlling an output power of a generator provided in this embodiment may be configured to perform the method for controlling an output power of a generator in the foregoing embodiment. Their implementation principles and technical effects are similar. Details are not described herein again. For details, reference may be made to the descriptions in the foregoing embodiment.

Based on the content of the foregoing embodiment, in this embodiment, the feedback circuit 23 includes: a first adder 101, a second adder 104, a third adder 105, a first regulator 102, a second regulator 106, a third regulator 107, a first comparator 103, and a second comparator 108.

A first input end of the first adder 101 is connected to a first output end of the second obtaining circuit 22 for receiving the overload voltage reference value Vrefin, a second input end of the first adder 101 is connected to a first output end of the first obtaining circuit 21 for receiving the output voltage value Vbus of the generator, and an output end of the first adder 101 is connected to an input end of the first regulator 102.

An output end of the first regulator 102 is connected to a first input end of the first comparator 103.

A second input end of the first comparator 103 is connected to a second output end of the second obtaining circuit 22 for receiving the output current reference value Iref, and an output end of the first comparator 103 is connected to a first input end of the second adder 104.

A second input end of the second adder 104 is connected to a second output end of the first obtaining circuit 21 for receiving the output current value Tout, and an output end of the second adder 104 is connected to an input end of the second regulator 106.

An output end of the second regulator 106 is connected to a first input end of the second comparator 108.

A first input end of the third adder 105 is connected to a third output end of the second obtaining circuit 22 for receiving the output voltage reference value Vrefout of the target controlled circuit, a second input end of the third adder 105 is connected to a third output end of the first obtaining circuit 21 for receiving the output voltage value Vout of the target controlled circuit, and an output end of the third adder 105 is connected to a second input end of the second comparator 108.

An output end of the second comparator 108 is connected to an input end of the control circuit.

The first adder 101 is configured to calculate the output voltage Vbus and the overload voltage reference value Vrefin of the generator, to obtain a first difference. The first regulator 102 is configured to obtain a first current loop given value Iref1 according to the first difference outputted by the first adder 101. The first comparator 103 is configured to determine a smaller value of the first current loop given value Iref1 and the output current reference value Iref. The second adder 104 is configured to calculate the smaller value obtained by the first comparator 103 and the output current value Tout of the target controlled circuit, to obtain a second difference. The second regulator 106 is configured to obtain a first control variable Iref2 according to the second difference outputted by the second adder 104. The third adder 105 is configured to calculate the output voltage reference value Vrefout of the target controlled circuit and the output voltage value Vout of the target controlled circuit, to obtain a third difference. The third regulator 107 is configured to obtain a second control variable Iref3 according to the third difference outputted by the third adder 105. The second comparator 108 is configured to determine a smaller value of the first control variable Iref2 and the second control variable Iref3. A first controller is configured to use the smaller value outputted by the second comparator 108 as a control variable used for controlling the target controlled circuit.

Further, different from the foregoing embodiment, in this embodiment, the feedback circuit 23 includes: a fourth adder 201, a fifth adder 203, a sixth adder 205, a fourth regulator 202, a fifth regulator 204, a sixth regulator 206, a third comparator 207, and a fourth comparator 208.

A first input end of the fourth adder 201 is connected to a first output end of the second obtaining circuit 22 for receiving the overload voltage reference value Vrefin, a second input end of the fourth adder 201 is connected to a first output end of the first obtaining circuit 21 for receiving the output voltage value Vout of the generator, and an output end of the fourth adder 201 is connected to an input end of the fourth regulator 202.

An output end of the fourth regulator 202 is connected to a first input end of the fourth comparator 208.

A first input end of the fifth adder 203 is connected to a second output end of the second obtaining circuit 22 for receiving the output current reference value Iref of the target controlled circuit, a second input end of the fifth adder 203 is connected to a second output end of the first obtaining circuit 21 for receiving the output current value Tout of the target controlled circuit, and an output end of the fifth adder 203 is connected to a first input end of the third comparator 207.

An output end of the fifth regulator 204 is connected to a first input end of the third comparator.

A first input end of the sixth adder 205 is connected to a third output end of the second obtaining circuit 22 for receiving the output voltage reference value Vrefout of the target controlled circuit, a second input end of the sixth adder 205 is connected to a third output end of the first obtaining circuit 21 for receiving the output voltage value Vout of the target controlled circuit, and an output end of the sixth adder 205 is connected to a second input end of the third comparator 207.

An output end of the sixth regulator 206 is connected to a second input end of the third comparator 207. An output end of the third comparator 207 is connected to a second input end of the fourth comparator 208.

An output end of the fourth comparator 208 is connected to an input end of the control circuit.

The fourth adder 201 is configured to calculate the output voltage value Vbus and the overload voltage reference value Vrefin of the generator, to obtain a fourth difference. The fourth regulator 202 is configured to obtain a second current loop given value according to the fourth difference outputted by the fourth adder 201. The fifth adder 203 is configured to calculate the output current reference value of the target controlled circuit and the output current value of the target controlled circuit, to obtain a fifth difference. The fifth regulator 204 is configured to obtain a third control variable according to the fifth difference outputted by the fifth adder. The sixth adder 205 is configured to calculate the output voltage reference value of the target controlled circuit and the output voltage value of the target controlled circuit, to obtain a sixth difference. The sixth regulator 206 is configured to obtain a fourth control variable according to the sixth difference outputted by the sixth adder. The third comparator 207 is configured to determine a smaller value of the third control variable and the fourth control variable.

The fourth comparator 208 is configured to obtain a smaller value of the smaller value obtained by the third comparator 207 and the second current loop given value.

A second controller is configured to use the smaller value outputted by the fourth comparator 208 as a control variable used for controlling the target controlled circuit.

In this embodiment, the control variable used for controlling the target controlled circuit is determined according to the output voltage value Vbus of the generator, the output current value Iout of the target controlled circuit, the output voltage value Vout of the target controlled circuit, the overload voltage reference value Vrefin of the generator, the output voltage reference value Vrefout of the target controlled circuit, and the output current reference value Iref of the target controlled circuit, so that the control of the target controlled circuit needs to rely on only a result of comparison among an input parameter (the output voltage value Vbus of the generator, that is, an input voltage of the target controlled circuit) and an output parameter (the output current value Iout of the target controlled circuit and the output voltage value Vout of the target controlled circuit) of the target controlled circuit, the overload voltage reference value Vrefin of the generator, the output voltage reference value Vrefout of the target controlled circuit, and the output current reference value Iref of the target controlled circuit, without using additional communication between a plurality of output circuits, thereby effectively improving the response speed of the entire circuit. In addition, in this application, whether overload occurs can be determined according to the output voltage value Vbus of the generator, so that the target controlled circuit can be controlled according to the detected output voltage value Vbus when overload occurs. Therefore, in this embodiment, utilization of the generator can be improved in two or more outputs, and overload can be further avoided.

It may be understood that compared with FIG. 3, FIG. 4 shows another feedback loop control structure. In FIG. 4, an output side of the target controlled circuit is directly controlled to determine a control variable, and a control variable is determined according to an input side. Then a smaller one of the two control variables is obtained, to determine a final control variable. It should be noted that, FIG. 3 and FIG. 4 show two different implementations. During specific use, a proper implementation may be selected.

In this embodiment, obtaining, by each regulation unit, a corresponding control variable according to a difference may be specifically performing PID regulation or PI regulation on a difference to obtain a corresponding control variable. Each regulator may be a PID regulator or a PI regulator.

The apparatus for controlling an output power of a generator provided in this embodiment may be configured to perform the method for controlling an output power of a generator in the foregoing embodiment. Their implementation principles and technical effects are similar. Details are not described herein again. For details, reference may be made to the descriptions in the foregoing embodiment.

In this embodiment, it should be noted that, the modules in the apparatus in the embodiments of this application may be integrated as one and may also be deployed separately. The modules may be combined into one module, or split into a plurality of submodules.

Based on the same invention idea, still another embodiment of this application provides a generator system. The system includes a generator and the apparatus for controlling an output power of a generator in the foregoing embodiment.

In this embodiment, the generator system may be a gasoline generator system, or may be a diesel generator system, or may be another generator system. This is not limited in this embodiment.

The generator system provided in this embodiment of this application includes the apparatus for controlling an output power of a generator in the foregoing embodiment. Therefore, the generator system provided in this embodiment has beneficial effect similar to that in the foregoing embodiment, and details are not described again herein. For details, reference may be made to the descriptions in the foregoing embodiment.

In an embodiment, the output end of the generator is connected to the two output circuits, and the two output circuits include an inverter circuit and a DC/DC circuit, as shown in FIG. 1. The DC/DC circuit is the target controlled circuit. The inverter circuit is configured to convert electricity outputted by the generator into an alternating current for output, and the DC/DC circuit is configured to convert the electricity outputted by the generator into a direct current for output. That is, in this embodiment, a priority of the inverter circuit is higher than a priority of the DC/DC circuit. When overload occurs, the DC/DC circuit is controlled according to an input and an output of the DC/DC circuit, to regulate an output power of the DC/DC circuit, so as to ensure power supply of the inverter circuit and ensure that the generator is not overloaded.

In an embodiment, the generator system further includes an energy storage circuit. The energy storage circuit is connected to an output end of the DC/DC circuit, so that the energy storage circuit can be charged by using the DC/DC circuit. That is, when the generator still has a surplus in external output, surplus electricity of the generator can be stored in the energy storage circuit. It may be understood than a battery module is disposed in the energy storage circuit, and the energy storage circuit may store electric energy. When the generator is overloaded, an output power of the DC/DC circuit for the energy storage circuit can be reduced, thereby preferentially ensuring output power supply of another output circuit.

Figure 6:
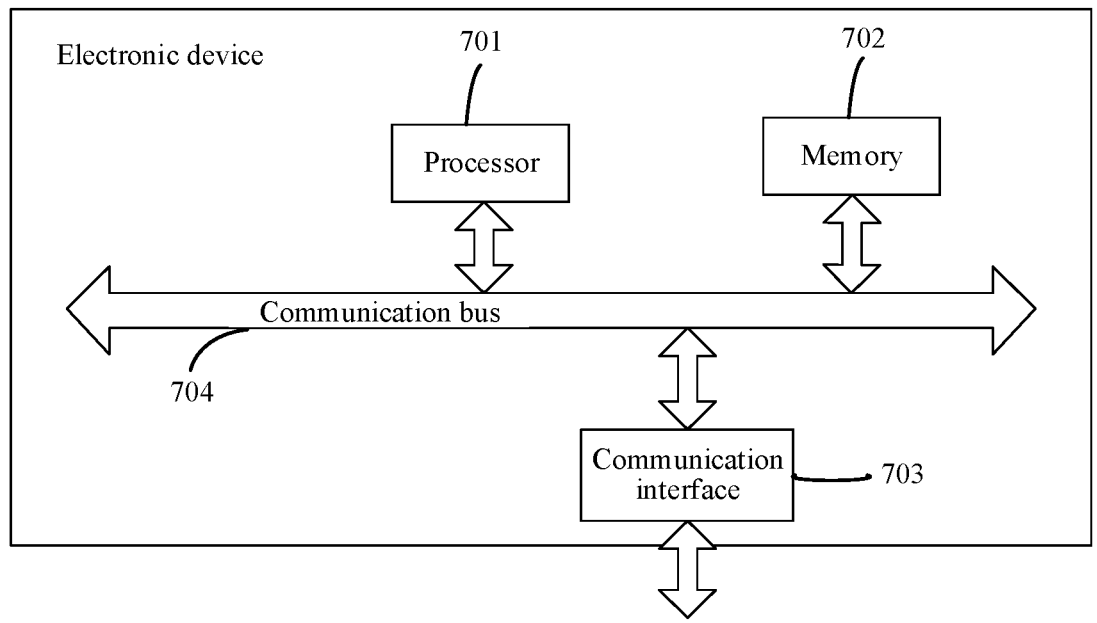
FIG. 6 is a schematic structural diagram of an electronic device according to an embodiment of this application.

Based on the same invention idea, still another embodiment of this application provides an electronic device. Referring to FIG. 6, the electronic device specifically includes: a processor 701, a memory 702, a communication interface 703, and a communication bus 704.

The processor 701, the memory 702, and the communication interface 703 communicate with each other by the communication bus 704.

The processor 701 is configured to invoke a computer program in the memory 702, and when executing the computer program, the processor implements all the steps of the method for controlling an output power of a generator.

It may be understood that for refined functions and extended functions executable by the computer program, reference may be made to the descriptions in the foregoing embodiments.

Based on the same invention idea, still another embodiment of this application provides a non-transitory computer-readable storage medium, storing a computer program. The computer program, when being executed by a processor, causes the processor to implement all the steps of the method for controlling an output power of a generator.

It may be understood that for refined functions and extended functions executable by the computer program, reference may be made to the descriptions in the foregoing embodiments.

In addition, the logic instructions in the memory may be stored in a computer-readable storage medium when implemented in a form of a software functional unit and sold or used as an independent product. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes various media that can store program code, for example: a USB flash drive, a removable hard disk, a read-only memory (ROM), a random access memory (RAM), a magnetic disk, or a compact disc.

Based on the foregoing descriptions of the implementations, a person skilled in the art may clearly understand that the implementations may be implemented by software plus a necessary general hardware platform, or certainly may be implemented by hardware. Based on such an understanding, the technical solutions essentially or the part contributing to the related art may be implemented in a form of a computer software product. The computer software product may be stored in a computer-readable storage medium, such as a ROM/RAM, a magnetic disk, or an optical disc, and includes several instructions for instructing a computer device (which may be a personal computer, a server, a network device, or the like) to perform the method for controlling an output power of a generator described in the embodiments or some parts of the embodiments.

In addition, in this application, the relational terms such as first and second are used only to differentiate an entity or operation from another entity or operation, and do not require or imply any actual relationship or sequence between these entities or operations. Furthermore, terms "include", "including" or any other variants are intended to encompass non-exclusive inclusion, such that a process, a method, an article or a device including a series of elements not only includes those elements, but also includes other elements not listed explicitly or includes intrinsic elements for the process, the method, the article, or the device. An element preceded by "includes a . . . " does not, without more constraints, preclude the existence of additional identical elements in the process, method, article, or device that includes the element.

Finally, it should be noted that the foregoing embodiments are merely used for describing the technical solutions of this application, but are not intended to limit this application. It should be understood by a person of ordinary skill in the art that although this application has been described in detail with reference to the foregoing embodiments, modifications can be made to the technical solutions described in the foregoing embodiments, or equivalent replacements can be made to some technical features in the technical solutions, and these modifications or replacements will not cause the essence of corresponding technical solutions to depart from the spirit and scope of the technical solutions in the embodiments of this application.

What is claimed is:

1. A method for controlling an output power of a generator, wherein at least two output circuits are disposed on an output end of the generator, at least one output circuit of the output circuits is configured as a target controlled circuit, and the method comprises:
   obtaining an output voltage value of the generator, an output current value of the target controlled circuit, and an output voltage value of the target controlled circuit;
   obtaining an overload voltage reference value of the generator, an output voltage reference value of the target controlled circuit, and an output current reference value of the target controlled circuit;
   performing calculation according to the output voltage value of the generator, the output current value of the target controlled circuit, the output voltage value of the target controlled circuit, the overload voltage reference value of the generator, the output voltage reference value of the target controlled circuit, and the output current reference value of the target controlled circuit, to obtain a target control variable; and
   generating a drive signal according to the target control variable, and sending the drive signal to the target controlled circuit, so that the target controlled circuit regulates an output power according to the drive signal,
   wherein performing the calculation according to the output voltage value of the generator, the output current value of the target controlled circuit, the output voltage value of the target controlled circuit, the overload voltage reference value of the generator, the output voltage reference value of the target controlled circuit, and the output current reference value of the target controlled circuit, comprises:
   performing calculation according to the output voltage value and the overload voltage reference value of the generator, to obtain a first difference, and obtaining a first current loop given value according to the first difference;
   using a smaller value of the first current loop given value and the output current reference value as a first comparison value, performing calculation according to the first comparison value and the output current value of the target controlled circuit, to obtain a second difference, and obtaining a first control variable according to the second difference;
   performing calculation according to the output voltage reference value of the target controlled circuit and the output voltage value of the target controlled circuit, to obtain a third difference, and obtaining a second control variable according to the third difference; and using a smaller value of the first control variable and the second control variable as the target control variable.

2. The method according to claim 1, wherein obtaining a corresponding control variable according to a difference is performing proportional integral derivative (PID) regulation or proportional integral (PI) regulation on each difference to obtain a corresponding control variable.

3. A method for controlling an output power of a generator, wherein at least two output circuits are disposed on an output end of the generator, at least one output circuit of the output circuits is configured as a target controlled circuit, and the method comprises:

obtaining an output voltage value of the generator, an output current value of the target controlled circuit, and an output voltage value of the target controlled circuit;

obtaining an overload voltage reference value of the generator, an output voltage reference value of the target controlled circuit, and an output current reference value of the target controlled circuit;

performing calculation according to the output voltage value of the generator, the output current value of the target controlled circuit, the output voltage value of the target controlled circuit, the overload voltage reference value of the generator, the output voltage reference value of the target controlled circuit, and the output current reference value of the target controlled circuit, to obtain a target control variable; and generating a drive signal according to the target control variable, and sending the drive signal to the target controlled circuit, so that the target controlled circuit regulates an output power according to the drive signal, wherein performing the calculation according to the output voltage value of the generator, the output current value of the target controlled circuit, the output voltage value of the target controlled circuit, the overload voltage reference value of the generator, the output voltage reference value of the target controlled circuit, and the output current reference value of the target controlled circuit, comprises:

performing calculation according to the output voltage value and the overload voltage reference value of the generator, to obtain a fourth difference, and obtaining a second current loop given value according to the fourth difference;

performing calculation according to the output current reference value of the target controlled circuit and the output current value of the target controlled circuit, to obtain a fifth difference, and obtaining a third control variable according to the fifth difference;

performing calculation according to the output voltage reference value of the target controlled circuit and the output voltage value of the target controlled circuit, to obtain a sixth difference, and obtaining a fourth control variable according to the sixth difference; and using a smaller value of the third control variable and the fourth control variable as a second comparison value, comparing the second comparison value with the second current loop given value, and using a smaller value of the second comparison value and the second current loop given value as the target control variable.

4. The method according to claim 3, wherein obtaining a corresponding control variable according to a difference is performing proportional integral derivative (PID) regulation or proportional integral (PI) regulation on each difference to obtain a corresponding control variable.

5. A generator system, comprising:

a generator, wherein at least two output circuits are disposed on an output end of the generator, and at least one output circuit of the output circuits is configured as a target controlled circuit; and an apparatus for controlling an output power, wherein the apparatus for controlling an output power comprises:

a first obtaining circuit, configured to obtain an output voltage value of the generator, an output current value of the target controlled circuit, and an output voltage value of the target controlled circuit;

a second obtaining circuit, configured to obtain an overload voltage reference value of the generator, an output voltage reference value of the target controlled circuit, and an output current reference value of the target controlled circuit;

a feedback circuit, configured to perform calculation according to the output voltage value of the generator, the output current value of the target controlled circuit, the output voltage value of the target controlled circuit, the overload voltage reference value of the generator, the output voltage reference value of the target controlled circuit, and the output current reference value of the target controlled circuit, to obtain a target control variable; and a control circuit, configured to generate a drive signal according to the target control variable, and send the drive signal to the target controlled circuit, so that the target controlled circuit regulates an output power according to the drive signal, wherein the feedback circuit comprises a first adder, a second adder, a third adder, a first regulator, a second regulator, a third regulator, a first comparator, and a second comparator;

a first input end of the first adder is connected to a first output end of the second obtaining circuit for receiving the overload voltage reference value, a second input end of the first adder is connected to a first output end of the first obtaining circuit for receiving the output voltage value of the generator, and an output end of the first adder is connected to an input end of the first regulator;

an output end of the first regulator is connected to a first input end of the first comparator;

a second input end of the first comparator is connected to a second output end of the second obtaining circuit for receiving the output current reference value, and an output end of the first comparator is connected to a first input end of the second adder;

a second input end of the second adder is connected to a second output end of the first obtaining circuit for receiving the output current value, and an output end of the second adder is connected to an input end of the second regulator;

an output end of the second regulator is connected to a first input end of the second comparator;

a first input end of the third adder is connected to a third output end of the second obtaining circuit for receiving the output voltage reference value of the target controlled circuit, a second input end of the third adder is connected to a third output end of the first obtaining circuit for receiving the output voltage value of the target controlled circuit, and an output end of the third adder is connected to a second input end of the second comparator; and an output end of the second comparator is connected to an input end of the control circuit.

6. The generator system according to claim 5, wherein each regulator is a PID regulator or a PI regulator.

7. The generator system according to claim 5, wherein the output end of the generator is connected to the two output circuits, and the two output circuits comprise an inverter circuit and a DC/DC circuit; and the DC/DC circuit is the target controlled circuit.

8. The generator system according to claim 7, further comprising an energy storage circuit, wherein the energy storage circuit is connected to an output end of the DC/DC circuit.

9. A generator system, comprising:
a generator, wherein at least two output circuits are disposed on an output end of the generator, and at least one output circuit of the output circuits is configured as a target controlled circuit; and
an apparatus for controlling an output power, wherein the apparatus for controlling an output power comprises:
a first obtaining circuit, configured to obtain an output voltage value of the generator, an output current value of the target controlled circuit, and an output voltage value of the target controlled circuit;
a second obtaining circuit, configured to obtain an overload voltage reference value of the generator, an output voltage reference value of the target controlled circuit, and an output current reference value of the target controlled circuit;
a feedback circuit, configured to perform calculation according to the output voltage value of the generator, the output current value of the target controlled circuit, the output voltage value of the target controlled circuit, the overload voltage reference value of the generator, the output voltage reference value of the target controlled circuit, and the output current reference value of the target controlled circuit, to obtain a target control variable; and
a control circuit, configured to generate a drive signal according to the target control variable, and send the drive signal to the target controlled circuit, so that the target controlled circuit regulates an output power according to the drive signal,
wherein the feedback circuit comprises: a fourth adder, a fifth adder, a sixth adder, a fourth regulator, a fifth regulator, a sixth regulator, a third comparator, and a fourth comparator;
a first input end of the fourth adder is connected to a first output end of the second obtaining circuit for receiving the overload voltage reference value, a second input end of the fourth adder is connected to a first output end of the first obtaining circuit for receiving the output voltage value of the generator, and an output end of the fourth adder is connected to an input end of the fourth regulator;
an output end of the fourth regulator is connected to a first input end of the fourth comparator;
a first input end of the fifth adder is connected to a second output end of the second obtaining circuit for receiving the output current reference value of the target controlled circuit, a second input end of the fifth adder is connected to a second output end of the first obtaining circuit for receiving the output current value of the target controlled circuit, and an output end of the fifth adder is connected to an input end of the fifth regulator;
an output end of the fifth regulator is connected to a first input end of the third comparator;
a first input end of the sixth adder is connected to a third output end of the second obtaining circuit for receiving the output voltage reference value of the target controlled circuit, a second input end of the sixth adder is connected to a third output end of the first obtaining circuit for receiving the output voltage value of the target controlled circuit, and an output end of the sixth adder is connected to an input end of the sixth regulator;
an output end of the sixth regulator is connected to a second input end of the third comparator;
an output end of the third comparator is connected to a second input end of the fourth comparator; and
an output end of the fourth comparator is connected to an input end of the control circuit.

10. The generator system according to claim 9, wherein the output end of the generator is connected to the two output circuits, and the two output circuits comprise an inverter circuit and a DC/DC circuit; and the DC/DC circuit is the target controlled circuit.

11. The generator system according to claim 10, further comprising an energy storage circuit, wherein the energy storage circuit is connected to an output end of the DC/DC circuit.

12. The apparatus according to claim 9, wherein each regulator is a PID regulator or a PI regulator.

* * * * *